May 7, 1963  R. G. TANSEY  3,088,141
SINGLE POINT SCREW THREAD CUTTING TOOL HAVING MEANS FOR
FEEDING THE TOOL AFTER SUCCESSIVE CUTS
Filed Jan. 7, 1960
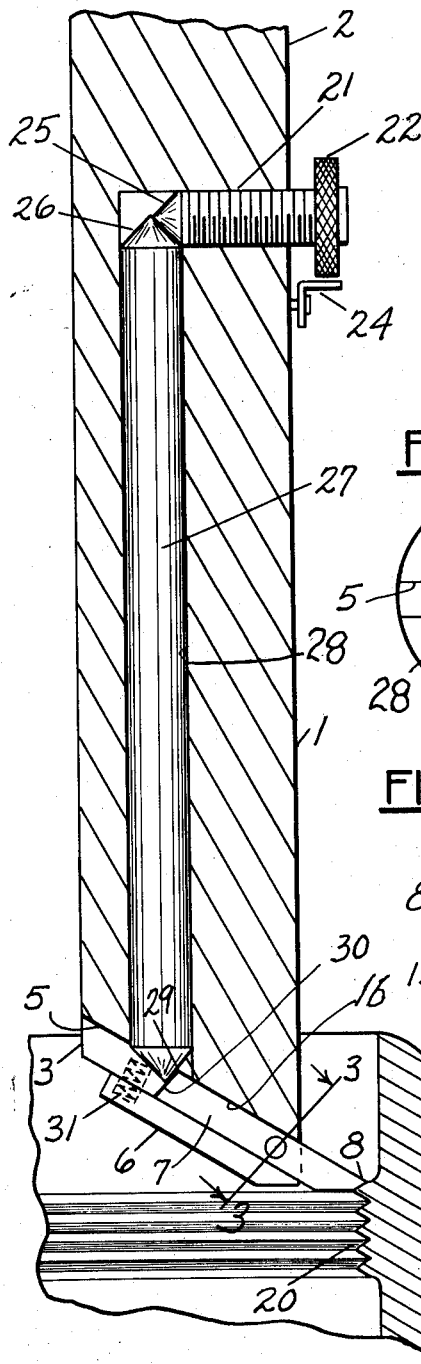
FIG. 1
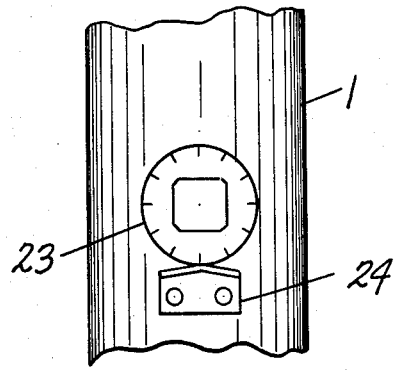
FIG. 4
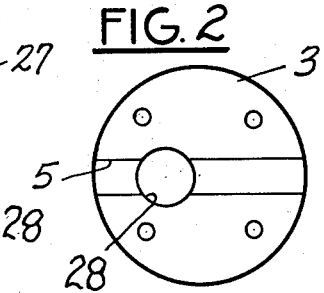
FIG. 2
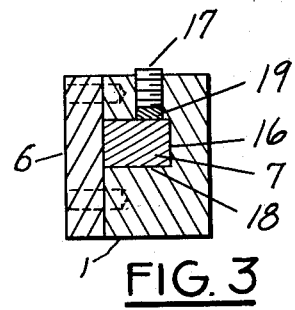
FIG. 3
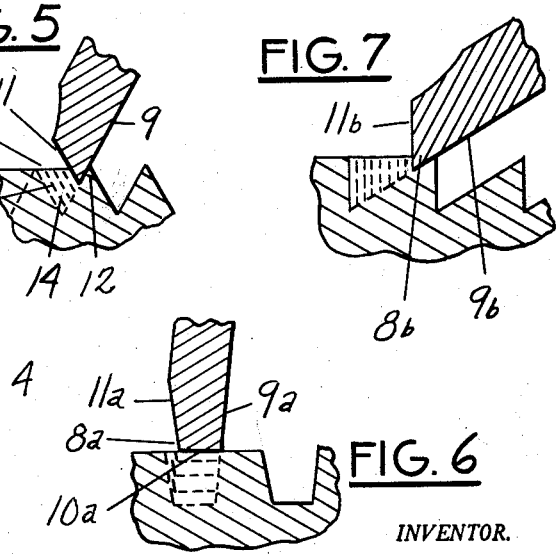
FIG. 5
FIG. 7
FIG. 6
INVENTOR.
Richard G. Tansey
BY Ralph Hammar
Attorney / # 3,088,141
SINGLE POINT SCREW THREAD CUTTING TOOL HAVING MEANS FOR FEEDING THE TOOL AFTER SUCCESSIVE CUTS
Richard G. Tansey, 828 E. 33rd St., Erie, Pa.
Filed Jan. 7, 1960, Ser. No. 1,119
1 Claim. (Cl. 10—101)

This invention is a threading bar which is particularly useful for cutting blind threads of all kinds. At the end of the bar which enters the work is a guideway for the shank of a single point bit having a tip shaped to correspond with the kind of thread to be cut, e.g. standard, acme, buttress. The inclination of the guideway also depends upon the kind of thread to be cut, the inclination being 30° for standard, 15° for acme and 60° for buttress threads. At a point on the bar outside the work and accessible to the operator is a graduated adjusting screw by means of which the bit may be advanced by set amounts along the guideway to control the depth of each cut. Motion from the adjusting screw is transferred through a push rod which cams the bit outward in proportion to the turning of the adjusting screw.

In the drawing, FIG. 1 is a section through the threading bar in position to cut an internal thread, FIG. 2 is a bottom view of the threading bar, FIG. 3 is a section on line 3—3 of FIG. 1, FIG. 4 is a fragmentary view of the depth of cut indicator, FIG. 5 is an enlarged view showing the relationship of the bit to a standard thread, FIG. 6 is a view showing the relationship of the bit to an acme thread, and FIG. 7 is a view showing the relationship of the bit to a buttress thread.

The threading bar 1 at one end 2 is suitably formed for attachment to a carriage driven by a lead screw which feeds the bar along the axis of the thread to be cut as indicated by the arrow. The shape of the end 2 will depend upon the carriage on which it is to be mounted. The opposite end 3 of the bar which enters the work diagrammatically illustrated at 4 has a guideway 5 inclined forward at an acute angle to the direction of feed. The angle is determined by the kind of thread to be cut. For the standard thread illustrated, the inclination of the guideway is 30° to the radial as illustrated in FIG. 5. For acme and buttress threads the inclination of the guideway is respectively 15° and 60° as illustrated in FIGS. 6 and 7.

The guideway is conveniently formed as a rectangular slot cut diametrically across the end 3 of the threading bar which has the same inclination as the guideway. The slot is closed by a friction cap 6 of aluminum bronze or other suitable bearing metal which is screwed to the threading bar to establish sliding friction contact with the shank of the bit. The slot receives the rectangular shank 7 of a bit having a tip 8 shaped to cut the desired thread. For the standard thread, as illustrated in FIG. 5, the tip has one side 9 extending in the same direction as the guideway 5 and has the other side 11 at 60° to the side 9. For the acme thread illustrated in FIG. 6, the tip 8a has one side 9a extending in the same direction as the guideway which in this case must be inclined forward at an angle of 15°. The other side 11a of the tip is inclined backward at an angle of 15° so the included angle between the sides 9a and 11a is 30°. The end 10a of the tip is parallel to the axis of the thread. For the buttress thread of FIG. 7, the tip 8b has one side 9b inclined forward at an angle of 60° and the other side 11b normal to the axis of the thread or at an angle of 60° to the side 9b. A different threading bar is used for each style of thread, the difference being in the inclination of the guideway 5 and in the shape of the tip (8, 8a or 8b) of the bit.

As the bit is advanced along the guideway 5, successive cuts are made by the side 11 (or 11a, 11b) of the tip while the side 9 (or 9a, 9b) merely follows along and finishes. For example, in machining the groove between two adjacent threads 12 and 13 in FIG. 5, a series of cuts would be taken along lines 14 all parallel to the side 11 of the tip. The chips would all be removed parallel to the side 11 of the tip and the side 9 of the tip would merely have a finishing function. The finishing will be improved if the guideway 5 has a forward inclination of 29½° instead of 30°. Similar dotted lines in FIGS. 6 and 7 indicate the successive cuts.

For accurate cutting of the threads, the shank of the bit must be tightly held in the guideway 5 so that the tip 8 will always be accurately positioned. The cap 6 holds the bit tightly against the bottom surface 16 of the guideway and a set screw 17 holds the bit tightly against the face 18 of the guideway. However, the bit is frictionally held so it can be fed relative to the bit holder to take successively deeper cuts. A washer 19 of aluminum bronze is arranged between the set screw and the bit. The washer 19 may be brazed to the set screw or may be a separate piece.

When used for cutting internal threads 20 as shown in FIG. 1, the bit is not accessible. To feed the bit relative to the bar there is an adjusting screw 21 having a head 22 provided with graduations 23 cooperating with an indicator 24 fixed to the bar. The screw extends crosswise to the axis of the bar and is provided with a conical end 25 which cooperates with a conical end 26 on a push rod 27 slidable in a bore 28 lengthwise of the bar and intersecting the guideway 5. As the end 25 of the adjusting screw is screwed inward, it acts on the conical end 26 of the push rod to force the push rod downward. The lower end of the push rod has a similar conical end 29 which cooperates with the inner end 30 of the bit and cams the bit outward along the guideway. From one aspect, the adjusting screw 21 is in the nature of a micrometer screw which indicates the amount the bit is advanced.

The adjusting screw will advance the bit in its guideway to take successively deeper cuts but will not retract the bit at the end of the thread cutting operation. The bit is retracted manually after first loosening the cap 6 and loosening the set screw 17 to reduce the friction on the shank of the bit. When this is done, the bit must be manually retracted in its guideway and the cap and set screw again tightened. To facilitate return of the bit, a spring 31 is arranged between the cap and the lower end of the push rod, exerting an upward force on the push rod so that the return of the bit does not require lifting of the push rod.

What is claimed as new is:

A screw thread cutting tool comprising a bar for attachment at one end to a carriage driven by a lead screw for feeding the tool along the axis of the screw thread to be cut with the bar extending axially of the screw thread and having at the other end a rectangular slot inclined forward in the direction of feed and outward from the direction of feed at an acute angle and parallel to a side of the screw thread to be cut, a friction cap fixed on said other end of the bar closing the slot, a bit having a rectangular shank slidably received in said slot and having a projecting point conforming to the sides of two adjacent threads with one side of the point extending in the same direction as the slot, said cap making friction contact with the shank of the bit and frictionally holding the shank of the bit during cutting, a lengthwise bore in the bar intersecting said slot, a push rod slidable in said bore, bit feed means including a feed screw for moving the push rod lengthwise toward said other end of the bar in proportion to the turning of the screw, said bit feed means being remote from said other end of the bar to permit adjustment while the bit is within the work being threaded, the shank of said bit and the push rod having complementary cam surfaces cooperating to feed in said slot relative to said bar the bit outward in proportion to the lengthwise movement of the push rod.

References Cited in the file of this patent

UNITED STATES PATENTS

| | | |
|---|---|---|
| 1,029,014 | Ivarson | June 11, 1912 |
| 1,392,203 | Nelson | Sept. 27, 1921 |
| 1,600,941 | Heybach | Sept. 21, 1926 |
| 2,330,156 | Stoen | Sept. 21, 1943 |
| 2,425,242 | Herring | Aug. 5, 1947 |
| 2,848,788 | Goglanian | Aug. 26, 1958 |

FOREIGN PATENTS

| | | |
|---|---|---|
| 210,917 | Great Britain | Feb. 14, 1924 |